United States Patent [19]

Maeda et al.

[11] Patent Number: 4,740,402

[45] Date of Patent: Apr. 26, 1988

[54] MATERIALS HAVING A DEOXIDATION FUNCTION AND A METHOD OF REMOVING OXYGEN IN SEALED CONTAINERS

[75] Inventors: Shigeyoshi Maeda; Tsunetoshi Asai, both of Kawasaki; Hidejiro Asano, Sagamihara; Haruyoshi Taguchi, Osaka, all of Japan

[73] Assignees: Nippon Steel Corporation, Tokyo; Suntory Limited, Osaka; Kansai Paint Co., Ltd., Hyogo, all of Japan

[21] Appl. No.: 927,709

[22] Filed: Nov. 7, 1986

[30] Foreign Application Priority Data

Nov. 8, 1985 [JP] Japan .................. 60-248722
Nov. 9, 1985 [JP] Japan .................. 60-251502

[51] Int. Cl.$^4$ .................. B65D 1/00; B32B 15/04; B32B 27/08
[52] U.S. Cl. .................. 428/35; 428/447; 428/457; 428/459; 428/464; 428/500; 428/508; 428/515

[58] Field of Search .................. 428/464, 35, 459, 447, 428/515, 500, 508, 457

[56] References Cited

U.S. PATENT DOCUMENTS 4,507,339  3/1985  Carbo et al. .................. 428/464 X
4,595,612  6/1986  Tavss et al. .................. 428/464

*Primary Examiner*—Thomas J. Herbert
*Attorney, Agent, or Firm*—Wenderoth, Lind & Ponack

[57] ABSTRACT

A sealed container material having a deoxidation function comprises a metallic base material reactive with oxygen and a hydrophilic coating layer of water-soluble polymer such as hydroxyethyl cellulose formed on the surface of the metallic base material. An oxygen- and moisture-permeable coating layer composed of a silicone resin or an olefin resin may further be provided on the hydrophilic coating layer. The material exhibits an excellent oxygen absorbing ability and is thus suited as a material for sealed containers, such as cans, bottles, capsules, etc., for encasing food, drink, chemicals, and medical drugs and storing them over a long period of time without denaturation or deterioration.

9 Claims, No Drawings

MATERIALS HAVING A DEOXIDATION FUNCTION AND A METHOD OF REMOVING OXYGEN IN SEALED CONTAINERS

BACKGROUND OF THE INVENTION

1. Field of the Invention

The present invention relates to container materials having a deoxidation function which can remove oxygen present in sealed containers to prevent changes in the quality and properties of foods and drinks contained in cans and sealed containers, etc. and enable their long term storage, and also relates to a method of removing oxygen in sealed containers prepared using such materials. The term "sealed container" used in the present invention means all kinds of sealed containers, such as cans, bottles, capsules, etc.

2. Description of the Related Art

Some foods, drinks, chemicals, etc., when brought into contact with oxygen in the air, are susceptible to putrefaction, denaturation or deterioration and as methods for preventing such, there have been hitherto practiced, for example, absorption and removal oxygen in the air contained in sealed containers by incorporating deoxidants (reductive organic compounds such as sulfoxylates, dithionates, etc.), capable of absorbing oxygen, either put in a permeable container or wrapped with a permeable film, together with foods, drinks, chemicals etc. into the sealed containers, etc.

Further, for sealed containers such as beer cans, juice cans, food cans, etc., a method of replacing oxygen present in the air in a head space or dissolved in contents of the sealed containers with inert gases such as nitrogen gas, carbon dioxide gas, etc. has also conventionally been practiced. However, the method using deoxidants incorporated in the sealed containers directly or using permeable film wrapping encounters problems that as the deoxidants are contained together with the foods or drinks in sealed containers, they must be separated from the foods or drinks and that heat generated due to vigorous oxidation of the deoxidants can be removed only with difficulty, which may produce adverse effects on the contents, etc.; therefore the actual situation is that none of the above conventional methods has been practically used for storage of liquid food and drink as well as chemicals. Further, the method using inert gas has been found to be unsatisfactory for removing oxygen dissolved in the contents.

If sealed containers per se were prepared from materials having a deoxidation function, there would be no necessity of separately preparing deoxidants and handling would be simple and deoxidation of the aforesaid liquid materials would become easy and thus, a useful deoxidation method would be provided.

Through extensive investigations with an attempt to develop materials having a deoxidation function capable of achieving the aforesaid objects, the present inventors have found that by providing a hydrophilic coating layer on the surface of a metallic base material, deoxidation proceeds extremely rapidly without hindering oxidation of the base material and have arrival at the present invention.

SUMMARY OF THE INVENTION

Namely, the present invention is concerned with materials having a deoxidation function, comprising a metallic base material reactive with oxygen and a hydrophilic coating layer and an oxygen-permeable coating layer formed on the surface of the base material.

DETAILED DESCRIPTION OF THE INVENTION

The base material on which a hydrophilic coating and/or an oxygen-permeable layer is formed for preparing the materials having a deoxidation function according to the present invention may be any metal readily reactive with oxygen, for example, iron, zinc, manganese, etc., or may be materials other than metals, such as a plastic film, cellophane, paper, glass, etc. having provided thereon a metallic thin layer of a metal readily reactive with oxygen, for example, iron, zinc, manganese, etc. either by a vacuum deposition method or with an adhesive.

As the metals used for the base material, ordinary steel sheets per se and surface-treated steel sheets conventionally used for cans, such as a tin-plated steel sheet, a nickel-plated steel sheet, a chrome-plated steel sheet, etc. may be used for preparing cans or containers for foods and drinks, e.g., beer, juice, and other edible substances. Those obtained by plating at least one of Fe, Zn and Mn on the surface of the surface-treated steel sheets described above in an extremely thin layer (0.5 to 20 $mg/dm^2$) are also preferred metallic materials in the present invention. The metallic base materials described above may further be chemically treated with, for example, phosphates, chromates, etc. Aluminum sheet can also be used as the metallic base materials but due to a stable oxidized layer formed on the surface thereof, aluminum per se does not react with oxygen or, if any, oxidation occurs extremely slowly. Therefore, the aluminum sheet is preferably coated with metals such as Fe, Zn, Mn etc., having oxygen absorbing ability.

Coating of Fe, Zn or Mn may be generally applied to the sheet surface corresponding to the inner surface of a can, but may also be performed on both surfaces, of course. It is necessary that the thickness (quantity) of the coating be enough to correspond to the quantity of oxygen contained in the contents of cans or sealed containers and accordingly, it varies depending upon the kind of contents and the wrapping (sealing) conditions.

In the case of, for example, a beer can of 350 ml (0.16 ml of $O_2$ in 24 ml of a head space), $O_2$ is consumed according to the following equation when taking the Fe coating as an example:

$$2Fe + 3/2O_2 + H_2O \rightarrow Fe_2O_3 \cdot H_2O \quad (1)$$

$$0.16 \text{ ml} \times \frac{4 \times 55.85 \text{ g}}{3 \times 22,400 \text{ ml}} = 0.53 \text{ mg Fe}$$

Namely, approximately 0.5 mg of Fe is required.

Assuming this quantity is furnished by a lid (area of 32 $cm^2$) of the can, 1.5 $mg/dm^2$ (0.5×100/32) is required (A similar amount is required in cases of Zn and Mn coatings). Accordingly, for surface-treated steel sheets or materials obtained by plating Fe, Zn or Mn on an aluminum sheet, it is sufficient to provide a coating in an amount ranging from 0.2 to 20 $mg/dm^2$, preferably 0.5 to 10 $mg/dm^2$, depending on the quantity of $O_2$ present in food to be canned.

As another method for providing the Fe surface more easily, a steel sheet, on one side of which is tinplate, tin-free steel (chrome-plated steel sheet) or nickel-plated steel sheet may also be used.

In the present invention, there is no particular limitation with respect to the coating composition used for forming the hydrophilic coating layer on the surface of the metallic base material as long as it can form a hydrophilic coating, but it is preferred to use an aqueous solution having a solid content of approximately 0.1 to 20 wt % of water-soluble polymer used as a binder and dissolved in water. The coating composition is applied by ordinarly coating means, for example, spray coating, etc. followed by natural drying or heat drying. The hydrophilic coating layer may be formed by coating the composition once or by repeating the coating twice or more with the same or different compositions. The thickness of the hydrophilic coating layer is generally in a range of 0.01 to 5 $\mu$m, preferably in a range of 0.05 to 1 $\mu$m. When the thickness of the coated layer is less than 0.01 $\mu$m, the desired oxygen absorbing ability is not obtained; on the other hand, when the thickness exceeds 5 $\mu$m, there are defects that rusts generate excessively, and waterproof or adhesion property is deteriorated.

The term "hydrophilic coating layer" as used in the present invention refers to a layer that is formed from a binder having a property of capable of readily dissolving in or swelling with water at normal temperatures and itself has affinity to water.

The water-soluble polymer used in the aforesaid coating composition may be classified into natural, semisynthetic and synthetic polymers. Examples of natural polymers include starch, gelatin, casein, vegetable rubbers, etc. and non-volatile residues of natural drinks. Examples of semi-synthetic polymers include cellulose derivatives, for example, methyl cellulose, ethyl cellulose, carboxymethyl cellulose, hydroxyethyl cellulose, etc. Examples of synthetic polymers include vinyl polymers such as polyvinyl alcohol, polyvinyl methyl ether, polyvinyl pyrrolidone, etc.; homopolymers of hydroxyethyl acrylate, hydroxyethyl methacrylate, acrylic acid, methacrylic acid, etc.; copolymers of the aforesaid monomers with acrylic acid or methacrylic acid alkyl esters (e.g., methyl acrylate, ethyl acrylate, methyl methacrylate, ethyl methacrylate, etc.), acrylic polymers such as polyacrylamide, etc., and other water-soluble polymers such as polyethylene oxide, etc.

Of the water-soluble polymers described above, cellulose derivatives, inter alia, hydroxyethyl cellulose are preferred polymers since they can impart an excellent oxygen absorbing ability to the base metals.

The coating composition constituting the hydrophilic coating layer exhibits its function sufficiently as far as it contains the aforesaid water-soluble polymer as a binder component, but in addition to the water-soluble polymer, water-soluble melamine resins, etc. may also be added to partially cross-link the coating composition within a range that does not damage the hydrophilic property.

In the present invention, the aforesaid hydrophilic coating layer may be applied to the entire surface of the metallic base material or, depending upon purposes, partly applied to, e.g., the lid or the bottom of a sealed container.

The materials having the hydrophilic coating layer according to the present invention have a very excellent oxygen absorbing ability; however, in case that the presence of rusts formed by reaction of the metals with oxygen and water might adversely affect the quality of, e.g., food or drink in a sealed container, such can be solved by providing an oxygen- and moisture-permeable coating layer further on the hydrophilic coating layer.

A coating composition for forming the aforesaid oxygen- and moisture-permeable coating layer contains such resins that can form a coating capable of permeating oxygen and moisture and minimizing transfer of part of the coating-forming components which injure flavor of the contents when they are brought into contact with the contents in a sealed container, or can minimize permeation of metal ions, metal oxides, and metal hydroxides.

In addition to the resin component described above, the composition for forming the oxygen- and moisture-permeable coating layer may also contain known pigments, fillers, plasticizers, etc. generally used in the field of paints, if necessary and desired. Particularly by admixing silver color pigments in the pigments, it is possible to shield rust formed on the metallic surface. The coating composition may be either of organic solvent type or water-soluble type.

An oxygen permeation amount (q) of the oxygen-and moisture-permeable coating layer provided in the present invention can be shown by the following equation:

$$q = \frac{P \times \Delta p \times A}{l} \times t$$

wherein q is an oxygen permeation amount (ml), P is an oxygen permeation coefficient (cm$^3$. cm/cm$^2$ sec. cmHg) of a resin, $\Delta$p is a difference in oxygen partial pressure between inside and outside the coating (mmHg), A is an area of a layer (cm$^2$), l is a thickness of the coating layer (cm) and t is time (sec).

A desired oxygen permeability of the oxygen-and moisture-permeable coating layer described above can be given when a resin having a P value (oxygen permeation coefficient of a resin in the above-described equation) of $10^{-10}$ cm$^3$. cm/cm$^2$. sec.cmHg or more, preferably $10^{-9}$ cm$^3$. cm/cm$^2$. sec.cmHg or more is used.

The layer having a higher oxygen permeability generally gives higher moisture permeability and by using the resin having the P value described above, a coating layer having a sufficient moisture permeability can be obtained.

As resins for providing the aforesaid oxygen-and moisture-permeable coating layer, there are known resins such as silicone resins, olefin resins, acryl resins, polyester resins, epoxy resins, polyamide resins, cellulose resins, etc. and, resins satisfying the property described above can be appropriately chosen from these resins. Among them, silicone resins are preferred since they generally have a large oxygen permeability and do not injure flavor of the can contents. It is preferred that the coating layer formed using these resins be soft since a soft coating layer generally permeates oxygen and moisture easily. On the other hand, however, the soft coating layer might adversely affect flavor of the contents. If this is the case, the coating layer may also be hardened to a certain degree, using cross-linking agents such as amino resins, phenol resins, etc. in combination.

The coating composition for forming oxygen-and moisture-permeable coating layer may be coated directly on the surface of the metallic material or onto the hydrophilic coating layer by coating means, such as roll coating, spray coating, immersion coating, etc. followed by natural drying or heat drying; alternatively, the coating composition may also be previously formed into a film form, which is then laminated directly on the surface of the metallic material or on the hydrophilic coating layer. For forming the oxygen- and moisture-permeable coating layer, fine concaves and/or fine convexes are previously formed on the surface of the metallic material on which the coating layer is to be formed, thereby to form cavities between the coating layer and the metal surface. By doing so, there is provided an effect of increasing a surface area of the metallic material and at the same time, the oxygen absorbing ability can be further improved by confining a substance capable of accelerating oxidation into the cavities.

The thickness of the oxygen-and moisture-permeable coating layer, when formed on the hydrophilic coating layer, is generally in a range of 1 to 50 μm, preferably in a range of 5 to 10 μm.

In the present invention, with the hydrophilic coating layer formed on the surface of the metallic material, the oxidation reaction between the oxygen and the metal is accelerated by the presence of water to markedly increase the oxygen absorbing ability, for reasons to be still theoretically clarified. Further, with the oxygen- and moisture-permeable coating layer formed on the hydrophilic coating layer, effects of rust (iron oxide) formed by the oxidation on the quality of substances to be stored can be avoided without lowering the oxygen absorbing ability.

Thus, the materials having a deoxidation function of the present invention can be worked into sealed containers which are conventionally made of metals, non-metallic materials such as plastics, glass, paper, etc. and can also be worked into crown caps, and other various caps for glass bottles and other various containers. In particular, the materials of the present invention are, when worked into metal-made sealed containers, suited for storing liquid substances mainly composed of water, such as beer, juice, tea, etc., whereby deterioration and denaturation of the contents can be prevented during storage over a long period of time and the quality can be maintained.

The present invention will be better understood from the following description of preferred embodiments. In the examples and comparative examples, "parts" and "%" are "parts by weight" and "% by weight", respectively.

DESCRIPTION OF PREFERRED EMBODIMENTS

Example 1

A tinplate substrate (steel sheet with no tin coating) was degreased with ultrasonic waves given in toluene, and was heated at 200° C. for 10 minutes to completely effect degrease. A composition obtained by mixing 1% hydroxyethyl cellulose aqueous solution with 10 PHR of hexakismethoxymethylmelamine as a cross-linking agent was coated on the tinplate substrate in a dry layer thickness of 0.1 μm with a bar coater. By heat drying at 200° C. for about 10 minutes, a hydrophilic coating layer was formed.

The coated plate thus obtained was used as a lid of a cylindrical glass container having a diameter of 65 mm and an inner volume of 350 m, in which beer was charged to have a head space of approximately 24 ml. After passage of 30 hours at 20° C., the oxygen concentration in the head space and the oxygen concentration in beer were measured by gas chromatography. The results are shown in Table 1.

Example 2

Onto the hydrophilic coating layer obtained in Example 1 was coated a composition obtained by mixing 3 parts of a hardener (manufactured by Toray Silicone Co., Ltd., trademark: RD-3) with 100 parts of silicone resin (manufactured by Toray Silicone Co., Ltd., trademark: DY38-04) having an oxygen permeation coefficient of $2.1 \times 10^{-9}$ cm$^3$. cm/cm$^2$. sec.cmHg in a dry layer thickness of approximately 10 μm using a bar coater. By heat drying at 200° C. for about 10 minutes, an oxygen- and moisture-permeable coating layer was formed.

Using the coated plate thus obtained, a test was performed in a manner similar to Example 1.

The results are shown in Table 1.

Example 3

Onto the degreased tinplate substrate of Example 1, 1% hydroxyethyl cellulose aqueous solution was coated in a thickness of 0.1 μm using a bar coater dried with heating at 120° C. for about 4 minutes to form a hydrophilic coating layer and further laminated with a silicone rubber film (made by Dow Corning Co., Ltd.) having a layer thickness of about 50 μm in a state wetted with water. Lids were made from the coated plate thus obtained and tests were performed in a manner similar to Example 1. The results are shown in Table 1.

Example 4

Using a vacuum deposition device (manufactured by JEOL, Ltd.), iron was deposited on one surface of a tetlon film (manufactured by Toray Industries, Inc.) in a vacuum degree of $\times 10^{-5}$ mmHg. A mean amount of the deposition layer per unit area was measured by dissolving in a hydrogen chloride aqueous solution and by the atomic absorption method and it was found the 5.2 mg of iron was deposited. On to the iron-deposited surface, 1% hydroxyethyl cellulose aqueous solution was coated in a dry layer thickness of 0.1 μm with a bar coater. By drying at 120° C. for about 4 minutes, a hydrophilic coating layer was formed.

The same silicone resin coating composition as used in Example 2 was coated onto the hydrophilic coating layer thus obtained in a manner similar to Example 2. By heat-drying at 200° C. for about 10 minutes, an oxygen- and moisture-permeable coating layer was formed.

Then, the coated film thus obtained having an area of about 100 cm$^2$ was immersed in the same container charged with beer as used in Example 1. After sealing the container with a glass lid, a test was performed in a manner similar to Example 1.

The results are shown in Table 1.

Comparative Example 1

A test (blank) was performed in a manner similar to Example 1 using an uncoated glass plate in place of the coated plate of Example 1.

Comparative Example 2

A test was performed in a manner similar to Example 1, using the degreased tinplate substrated per se. A deoxidation ability was noted but iron was dissoluted to denaturate beer.

Comparative Example 3

A test was performed in a manner similar to Example 1 except that the thickness of the hydrophilic coating layer was changed to 7 μm. A deoxidation ability was extremely high but blister-like swelling was observed in the coating layer.

Comparative Example 4

A test was performed in a manner similar to Example 1, using a coated plate obtained by directly coating the same silicone resin coating composition as used in Example 2 on the degreased tinplate substrate. Deoxidation was insufficient.

Comparative Example 5

In a mixture solvent of 125 parts of Solbesso 100 (manufactured by Esso Co., Ltd., petroleum-mixed solvent) and 125 parts of ethylene glycol monobutyl ether were mixed with 80 parts of vinyl chloride sol (manufactured by Teneco Co., Ltd., trademark: Teneco 1730) and 20 parts of Adekasizer O-130P (manufactured by Asahi Denka Kogyo K.K., plasticizer). After stirring them, the mixture was dispersed with a ball mill until coarse particles became 20 μm or smaller to prepare a thermoplastic vinyl chloride sol coating.

Then, the aforesaid vinyl chloride sol coating was coated onto a tinplate having a hydrophilic coating layer obtained in a manner similar to Example 1 in a layer thickness of 50 μm followed by heat drying at 200° C. for about 10 minutes. Using the coated plate, a test was performed in a manner similar to Example 1. Deoxidation was insufficient.

An oxygen permeation coefficient of the coating formed from the vinyl chloride sol coating described above showed $7.6 \times 10^{-12} cm^3 \cdot cm/cm^2 \cdot sec \cdot cmHg$.

Example 5

A polyethylene layer (low density polyethylene, specific gravity of 0.920, oxygen permeation coefficient of $3.5 \times 10^{-10} cm/cm^2 \cdot sec \cdot cmHg$) having a thickness of 50 μm, which had been previously surface-treated with chromic acid was adhered onto the hydrophilic coating layer of the coated plate obtained in Example 1 with heating under pressure. Thereafter the coated plate was quenched to form a dual coating layer of hydrophilic coating layer/oxygen- and moisture-permeable coating layer.

Using the coated plate thus obtained, a test was performed in a manner similar to Example 1.

The results are shown in Table 1.

Example 6

50 tinplate without chromate treatment (tin coating: 11.2 g/m² on both sides) was subjected to cathodic electrolysis at 10 A/dm² for 2 seconds in a plating bath of 250 g/l $FeSO_4 \cdot 7H_2O$, 42 g/l $FeCl_2 \cdot 4H_2O$ and 20 g/l $NH_4Cl$ using iron as a counter electrode to give a tin-undercoated, Fe-plated steel plate having a Fe coating of approximately 3.5 mg/dm².

A dual coating layer of a hydrophilic coating layer/silicone resin was formed on the Fe-coated tinplate under conditions shown in Example 2.

Using the coated plate thus obtained, a test was performed in a manner similar to Example 1. The results are shown in Table 1 described hereinbelow.

Example 7

A chromate-treated #50 tinplate was subjected to cathodic electrolysis at 10 A/dm² for 1.5 seconds in a plating bath of 240 g/l $ZnSO_4 \cdot 7H_2O$, 15 g/l $NH_4Cl$ and 30 g/l $Al_2(SO_4)_3 \cdot 18H_2O$, using a zinc plate as a counter electrode to give a Zn-plated tinplate having a Zn coating of 5 mg/dm². A dual coating layer of hydrophilic coating layer/polyethylene layer was formed on the Zn-coated tinplate under conditions shown in Example 5.

Using the coated plate thus obtained, a test was performed in a manner similar to Example 1. The results are shown in Table 1 described hereinbelow.

Example 8

A tin-free steel plate (coated with metallic chrome: 100 mg/m², hydrated chrome oxide: 15 mg/m²) was subjected to Zn plating under conditions as shown in Example 7 to give a chrome-undercoated, Zn-plated steel plate having a Zn coating of 4.9 mg/dm². A dual coating layer of hydrophilic coating layer/polyethylene layer was formed on the Zn-Cr coated steel plate under conditions shown in Example 5.

Using the coated plate thus obtained, a test was performed in a manner similar to Example 1. The results are shown in Table 1 described hereinbelow.

Example 9

A nickel-plated steel plate (Ni coating: 700 mg/m²+chromate treatment) for cans was subjected to Zn plating under conditions shown in Example 7 to give a nickel-undercoated, Zn-plated steel plate having a Zn coating of 5.1 mg/dm² A dual coating layer of hydrophilic coating layer/silicone resin was formed on the Zn-Ni coated steel plate under conditions shown in Example 2.

Using the coated plate thus obtained, a test was performed in a manner similar to Example 1. The results are shown in Table 1 described hereinbelow.

Example 10

A rolled aluminum sheet for cans and lids was subjected to Zn plating under conditions shown in Example 7 to give a Zn-plated aluminum sheet having a Zn coating of 3.8 mg/dm². A dual coating layer of hydrophilic coating layer/silicone resin was formed on the Zn-coated aluminum sheet under conditions shown in Example 2.

Using the coated aluminum sheet thus obtained, a test was performed in a manner similar to Example 1. The results are shown in Table 1 described hereinbelow.

TABLE 1

| | Amount of $O_2$ in Head Space (mg/24 ml) | Amount of $O_2$ in Beer (ppm) |
| --- | --- | --- |
| Example 1 | 0.006 | 0.007 |
| Example 2 | 0.01 | 0.008 |
| Example 3 | 0.02 | 0.011 |
| Example 4 | 0.03 | 0.010 |
| Example 5 | 0.03 | 0.02 |
| Example 6 | 0.016 | 0.015 |
| Example 7 | 0.03 | 0.03 |
| Example 8 | 0.03 | 0.02 |
| Example 9 | 0.02 | 0.012 |
| Example 10 | 0.018 | 0.02 |
| Comparative Example 1 | 0.16 | 0.11 |
| Comparative Example 2 | 0.005 | 0.009 |
| Comparative Example 3 | 0.01 | 0.006 |
| Comparative Example 4 | 0.12 | 0.08 |
| Comparative Example 5 | 0.14 | 0.09 |

Example 11

A tinplate was degreased in a conventional manner, and a synthetic resin having a high oxygen permeation coefficient was coated on one side of the tinplate and dried with heating to prepare a lid.

A glass-made cylindrical container having an inner volume of about 374 ml and a cross-sectional area of 32 cm² charged with 350 ml of treated water was covered with the lid, which was sealed with vaseline to make an experimental container having a head space of approximately 24 ml.

Using this experimental container, deoxidation ability of the container of the present invention was evaluated by changing the composition and thickness of the permeable coating layer formed on the lid. The experimental results are described hereinafter.

Measurement of the amount of oxygen was determined by measuring the amount of oxygen in the head space and the amount of oxygen dissolved in the treated water, respectively, by gas chromatography and making the sum the total oxygen amount; then the total amount of oxygen prior to the experiment, namely, immediately after sealing was compared with the amount of oxygen consumed according to the present invention.

The tinplate coated with an oxygen- and moisture-permeable coating layer composed of epoxyphenol resin having an oxygen permeation coefficient of $6.0 \times 10^{-11}$ cm³.cm/cm².sec.cmHg in a layer thickness of 8 μm was used as the lid. The amount of the total residual oxygen in the sealed container was measured at 20° C. after passage of 24 hours. The results are shown in Table 2.

No elution of iron into the treated water was noted. No change was found on either taste or flavor in organoleptic evaluation.

Example 12

A tinplate (similar to the tinplate in Example 11) coated with an oxygen- and moisture-permeable coating layer composed of melamine alkyd resin having an oxygen permeation coefficient of $4.3 \times 10^{-11}$ cm³.cm/cm².sec.cmHg in a layer thickness of 8 μm was used as the lid. The amount of the total residual oxygen was measured at 20° C. after passage of 24 hours in a manner similar to Example 11. The results are shown in Table 2.

In this case, no elution of iron into the treated water was noted as in Example 11. No abnormality was found in organoleptic evaluation.

Example 13

A tinplate (similar to the tinplate in Example 11) coated with a permeable coating layer was composed of silicone resin having an oxygen permeation coefficient of $2.1 \times 10^{-9}$ cm³. cm/cm². sec.cmHg in a layer thickness of 20 μm and used as the lid. The amount of the consumed oxygen was measured at 20° C. after passage of 30 hours. The results are shown in Table 2.

No exudation of iron into the treated water was noted. No abnormality was found in organoleptic evaluation.

In Examples 11 to 13 described above, differences in the amount of oxygen removed were based on differences in permeability of oxygen or moisture of the permeable coating layers; layers having good permeability of oxygen or moisture and capable of surely preventing permeation of the oxidation products are suited as permeable coating layers. In addition to the resins described above, olefin resins, acryl resins, polyester resins, polyamide resins, vinyl resins, cellulose resins, etc. are employed.

The sealed container may be a glass bottle or a plastic container and in such a case, crowns or caps are formed with metals readily reactive with oxygen such as iron, zinc, manganese, etc. and the inner surface of these crowns or caps may be coated with the oxygen-and moisture-permeable coating layer.

TABLE 2

| | (Deoxidation Rate) | | |
|---|---|---|---|
| | Total Oxygen Amount Immediately after Sealing (mg) | Total Oxygen Amount after Passage of Definite Time Period (mg) | Removal Rate (%) |
| Example 11 | 0.385 | 0.270 | 30 |
| Example 12 | 0.385 | 0.289 | 25 |
| Example 13 | 0.350 | 0.147 | 58 |

While the invention has been described in detail with reference to specific embodiments thereof, it will be apparent to one skilled in the art that various changes and modifications can be made therein without departing from the spirit and scope thereof.

What is claimed is:

1. A sealed containing having a deoxidation function having at least part of said container being composed of the material having deoxidation function comprising
   (a) a metallic base material reactive with oxygen,
   (b) a hydrophilic coating layer formed on the surface of said metallic base material, and
   (c) an oxygen- and moisture-permeable coating layer formed on said hydrophilic coating layer.

2. The sealed container according to claim 1 in which said part of the container is the container body.

3. The sealed container according to claim 1 in which the part of the container is a light or a cap.

4. A material having a deoxidation function comprising
   (a) a metallic base material reactive with oxygen,
   (b) a hydrophilic coating layer formed on the surface of said metallic base material, and
   (c) an oxygen- and moisture-permeable coating layer formed on said hydrophilic coating layer.

5. The material having a deoxidation function according to claim 4 wherein said hydrophilic coating layer comprises a cellulose derivative.

6. The material having a deoxidation function according to claim 4 wherein said oxygen- and moisture-permeable coating layer is composed of one selected from the group consisting of a silicone resin and an olefin resin.

7. The material having a deoxidation function according to claim 4 wherein said metallic base material is a sheet material selected from the group consisting of a steel sheet, a tinplate, a nickel-plated steel sheet, a chromium-plated steel sheet and an aluminum sheet.

8. The material having a deoxidation function according to claim 1, wherein said metallic base material is a plastic sheet coated with a metal reactive with oxygen.

9. The material having a deoxidation function according to claim 8 in which the metal reactive with oxygen is selected from the group consisting of Fe, Zn and Mn.

* * * * *

UNITED STATES PATENT AND TRADEMARK OFFICE
CERTIFICATE OF CORRECTION

PATENT NO. : 4,740,402

DATED : April 26, 1988

INVENTOR(S) : Shigeyoshi MAEDA; Tsunatoshi ASAI; Hidejiro ASANO; Haruyoshi TAGUCHI It is certified that error appears in the above-identified patent and that said Letters Patent is hereby corrected as shown below:

Claim 1, line 1, change "containing" to --container--.

Claim 3, line 2, change "light" to --lid--.

Signed and Sealed this

Thirtieth Day of January, 1990

Attest:

JEFFREY M. SAMUELS

Attesting Officer — Acting Commissioner of Patents and Trademarks